United States Patent
Koziak et al.

(10) Patent No.: US 10,462,984 B1
(45) Date of Patent: Nov. 5, 2019

(54) WATERING SYSTEM

(71) Applicants: Julian Koziak, Los Angeles, CA (US); Valantyn Koziak, Los Angeles, CA (US)

(72) Inventors: Julian Koziak, Los Angeles, CA (US); Valantyn Koziak, Los Angeles, CA (US)

(*) Notice: Subject to any disclaimer, the term of this patent is extended or adjusted under 35 U.S.C. 154(b) by 0 days.

(21) Appl. No.: 15/996,428

(22) Filed: Jun. 1, 2018

Related U.S. Application Data

(60) Provisional application No. 62/514,222, filed on Jun. 2, 2017.

(51) Int. Cl.
- *A01C 21/00* (2006.01)
- *A01G 25/16* (2006.01)
- *A01G 29/00* (2006.01)
- *A01G 25/06* (2006.01)
- *A01G 25/02* (2006.01)

(52) U.S. Cl.
CPC ............. *A01G 25/06* (2013.01); *A01G 25/02* (2013.01)

(58) Field of Classification Search
CPC ........ A01C 21/00; A01G 9/247; A01G 25/06; A01G 25/16; A01G 29/00; E02B 11/00; E02B 11/005; E03F 1/002
USPC ... 47/57.5, 48.5, 48.5 M, 48.5 G, 27, 42, 43, 47/79, 80; 248/87, 156, 85, 86, 88, 75; 239/271, 273, 276, 285, DIG. 1; 138/106, 105; 111/7.1, 7.2; 43/131; 405/36–51
See application file for complete search history.

(56) References Cited

U.S. PATENT DOCUMENTS

| | | | | |
|---|---|---|---|---|
| 2,084,817 | A * | 6/1937 | Lombard | B05B 3/06 239/211 |
| 2,711,927 | A * | 6/1955 | Miller | B05B 15/622 239/276 |
| 3,941,342 | A * | 3/1976 | Bradshaw | B05B 1/20 248/88 |
| 4,002,357 | A * | 1/1977 | Bennett | F16L 3/00 141/388 |
| 4,256,262 | A * | 3/1981 | Rosenberg | B05B 15/622 239/276 |
| D263,903 | S * | 4/1982 | Johnston | D23/217 |
| 4,819,877 | A * | 4/1989 | Ciccolallo | A01G 25/162 239/266 |
| 4,944,476 | A * | 7/1990 | Olson | A01G 25/00 248/87 |
| 5,113,888 | A * | 5/1992 | Beggs | A01G 25/167 137/1 |

(Continued)

*Primary Examiner* — Benjamin F Fiorello
*Assistant Examiner* — Edwin J Toledo-Duran
(74) *Attorney, Agent, or Firm* — Law Office of Michael O'Brien; Michael O'Brien; Jack Fritz

(57) ABSTRACT

A watering system is configured to distribute water below a ground surface. The watering system has a spike housing, further comprising fins that are configured to penetrate the ground surface. A water tube is centrally arranged in the spike housing and further comprising a plurality of water openings and a water line connection. A water line support channel is mechanically coupled to the fins and linearly aligned with the water line connection. A waterline is arranged on the water line support channel provides water through the water line connection, through the water tube where the water is then distributed through the holes below the ground surface.

4 Claims, 3 Drawing Sheets

(56) References Cited

U.S. PATENT DOCUMENTS

| | | | | |
|---|---|---|---|---|
| 5,340,027 | A * | 8/1994 | Yu | A01G 25/023 |
| | | | | 239/106 |
| 5,605,010 | A * | 2/1997 | Furlong | A01G 29/00 |
| | | | | 47/47 |
| 5,687,909 | A * | 11/1997 | Dean | B05B 15/622 |
| | | | | 239/276 |
| 8,038,082 | B2 * | 10/2011 | Belford | A01G 25/023 |
| | | | | 239/273 |
| 8,297,535 | B1 * | 10/2012 | Reid | B01F 1/0033 |
| | | | | 137/268 |
| 2002/0074428 | A1 * | 6/2002 | Djordjevic | B05B 9/01 |
| | | | | 239/276 |
| 2002/0089175 | A1 * | 7/2002 | Ericksen | F16L 33/30 |
| | | | | 285/61 |
| 2005/0051640 | A1 * | 3/2005 | Sirkin | B05B 15/00 |
| | | | | 239/104 |
| 2010/0025498 | A1 * | 2/2010 | Cole | A01G 25/06 |
| | | | | 239/538 |
| 2011/0056128 | A1 * | 3/2011 | King | A01G 29/00 |
| | | | | 47/48.5 |
| 2011/0079661 | A1 * | 4/2011 | Barton | B05B 15/70 |
| | | | | 239/201 |
| 2015/0181820 | A1 * | 7/2015 | Crook | A01G 29/00 |
| | | | | 47/48.5 |
| 2015/0283572 | A1 * | 10/2015 | Burrous | B05B 15/70 |
| | | | | 239/76 |
| 2016/0346802 | A1 * | 12/2016 | McCaslin | A01G 25/02 |
| 2017/0087580 | A1 * | 3/2017 | Griffin | B05B 15/68 |
| 2017/0144007 | A1 * | 5/2017 | Kelley | A62C 31/28 |
| 2018/0281009 | A1 * | 10/2018 | Boughton | A01G 25/02 |

\* cited by examiner

WATERING SYSTEM

RELATED APPLICATION

This application claims priority to provisional patent application U.S. Ser. No. 62/514,222 filed on Jun. 2, 2017, the entire contents of which is herein incorporated by reference.

BACKGROUND

The present disclosure is generally related to agricultural water-saving irrigation technology equipment, and more specifically to deep root watering.

In general, traditional watering systems spray water above the soil and at least 50% is lost to evaporation. Moreover, not only does half the water get lost to evaporation, but the surface water does not generally reach the roots of the plant.

What is needed is an efficient means for applying water to vegetation at or below a surface level of the soil.

SUMMARY

A watering system is configured to distribute water below a ground surface.

The watering system has a spike housing, further comprising fins that are configured to penetrate the ground surface. A water tube is centrally arranged in the spike housing and further comprising a plurality of water openings and a water line connection. A water line support channel is mechanically coupled to the fins and linearly aligned with the water line connection. A waterline is arranged on the water line support channel provides water through the water line connection, through the water tube where the water is then distributed through the holes below the ground surface.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figures 1, 2:
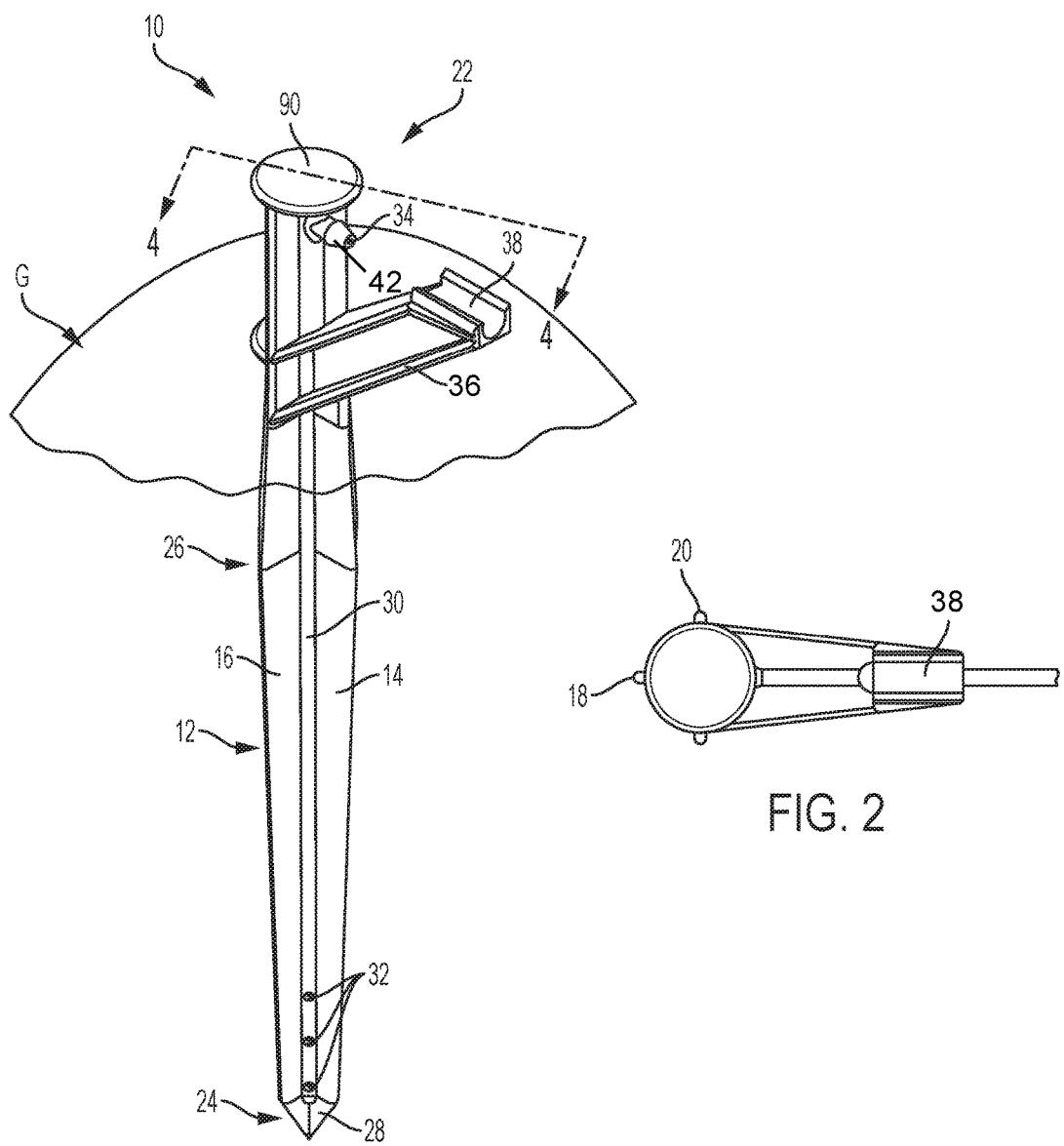
FIG. 1 shows a perspective view of one embodiment of the present invention.
FIG. 2 shows a top view of one embodiment of the present invention.
Figure 3:
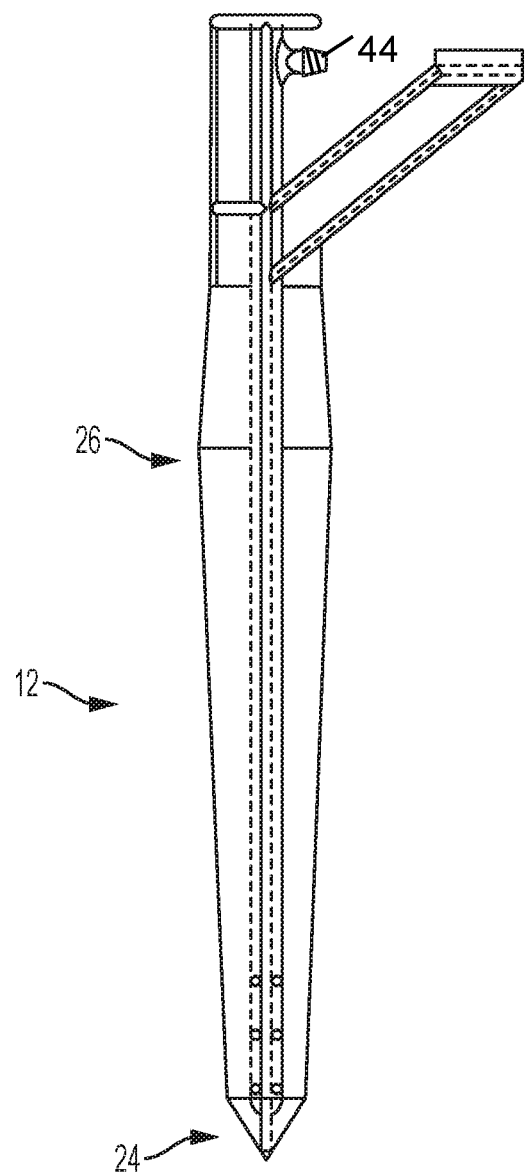
FIG. 3 shows a side view of one embodiment of the present invention.
Figure 4:
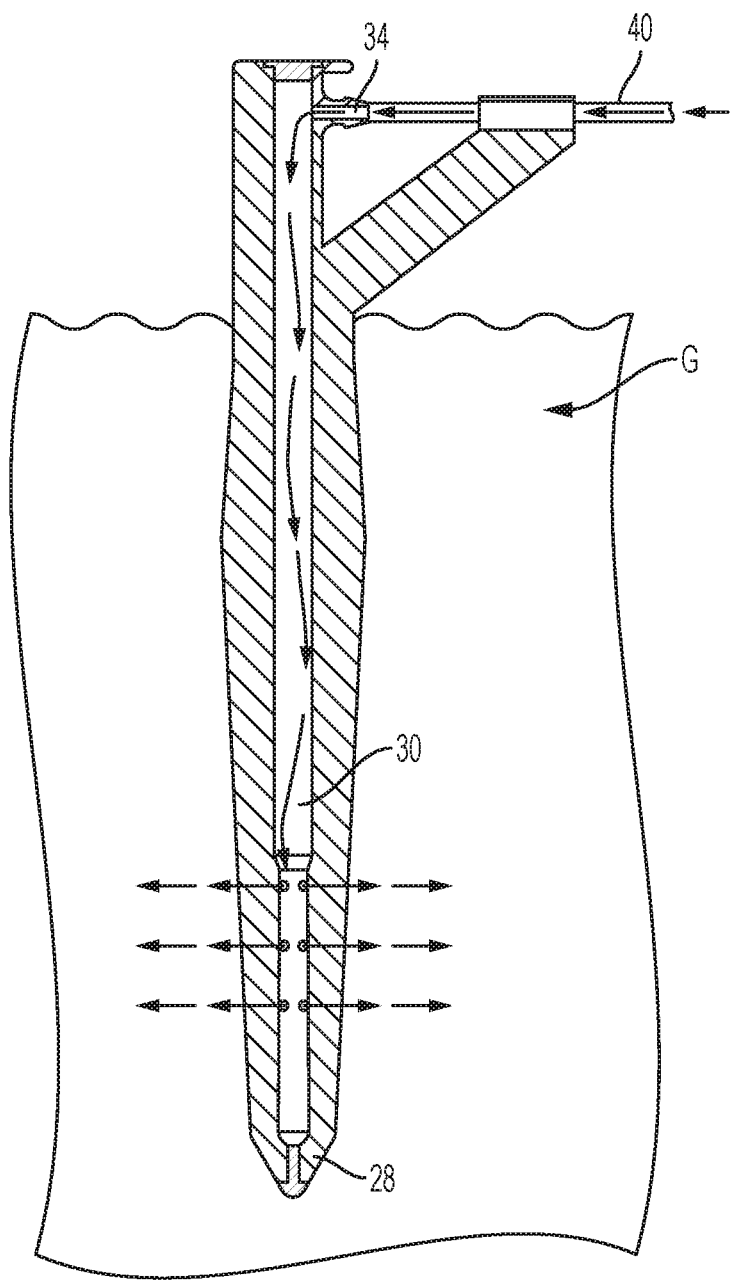
FIG. 4 shows a section view of one embodiment of the present invention taken along line 4-4 in FIG. 1.

By way of example, and referring to FIG. 1, one embodiment of a watering system 10 is configured to distribute water below a ground surface G. The watering system 10 has a spike housing 12. The spike housing 12 further comprises a first fin 14, a second fin, 16, a third fin 18, and a fourth fin 20. The spike housing 12 extends from a top portion 22 to a bottom portion 24. From the top portion 22, each fin expands outward until a midway portion 26 and then contracts toward the bottom portion 24. At a spike housing bottom there is a prismatic edge 28 which is particularly effective at piercing the ground surface G.

A water tube 30 is centrally arranged in the spike housing 12 and further comprising a plurality of water openings 32 proximate the bottom portion. At the top portion the spike housing 12 further comprises a water line connection 34. The spike housing 12 is further attached to a support bracket 36. The support bracket 36 further comprises a water line support channel 38.

The water line support channel 38 is linearly aligned with the water line connection 34. A waterline 40 is arranged on the water line support channel 38 and provides water through the water line connection 34, through the water tube 30 where the water is then distributed through the plurality of water openings 32 below the ground surface.

In some embodiments, a round flat coin shaped top 90 is formed at a top of the spike housing 12. In some embodiments the water line connection 34 can have a tapered nipple receptacle 42. In some embodiments, the water line connection 34 can have a threaded nipple receptacle 44.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A watering system, configured to distribute water below a ground surface; the watering system comprising:
   a spike housing, further comprising fins that are configured to penetrate the ground surface;
   a water tube, centrally arranged in the spike housing and further comprising a plurality of water openings and a water line connection;

a support bracket, joined to the spike housing and extending outward from the spike housing while rising in a spike housing upper direction;

a water line support channel, arranged on top of the support bracket, and joined to the fins with the support bracket and linearly and horizontally aligned with the water line connection;

wherein a waterline, arranged on the water line support channel provides water through the water line connection, through the water tube where the water is then distributed through the plurality of water openings below the ground surface.

2. The watering system, of claim 1, further comprising: a round flat coin shaped top
formed at a top of the spike housing.

3. The watering system, of claim 1, wherein the water line connection has a tapered nipple receptacle.

4. The watering system, of claim 1, wherein the water line connection has a threaded nipple receptacle.

\* \* \* \* \*